United States Patent
Zhong

(10) Patent No.: US 10,177,945 B1
(45) Date of Patent: Jan. 8, 2019

(54) JOINT ADAPTATION OF HIGH AND LOW FREQUENCY GAINS OF A LINEAR EQUALIZER

(71) Applicant: Apple Inc., Cupertino, CA (US)

(72) Inventor: Lizhi Zhong, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/660,361

(22) Filed: Jul. 26, 2017

(51) Int. Cl.
H04L 25/03 (2006.01)

(52) U.S. Cl.
CPC .. *H04L 25/03885* (2013.01); *H04L 25/03057* (2013.01); *H04L 25/03178* (2013.01); *H04L 2025/0349* (2013.01)

(58) Field of Classification Search
CPC ......... H04L 25/03885; H04L 25/03057; H04L 25/03178; H04L 2025/0349
See application file for complete search history.

(56) References Cited

U.S. PATENT DOCUMENTS

| | | | |
|---|---|---|---|
| 6,724,839 B1 * | 4/2004 | Chan | H04L 25/03159 375/232 |
| 6,819,166 B1 * | 11/2004 | Choi | H04L 25/03885 327/551 |
| 8,090,047 B2 * | 1/2012 | Fujimori | H04B 10/291 375/295 |
| 9,172,566 B1 * | 10/2015 | Li | H04L 25/03885 |
| 9,264,102 B2 | 2/2016 | Cheung | |
| 9,484,867 B2 | 11/2016 | Arcudia | |
| 9,628,304 B2 * | 4/2017 | Hoang | H04L 25/03 |
| 2013/0121395 A1 * | 5/2013 | Shakiba | H04L 25/03885 375/232 |
| 2016/0308694 A1 | 10/2016 | Hoang | |
| 2018/0152327 A1 * | 5/2018 | Lee | H04L 25/0307 |

* cited by examiner

*Primary Examiner* — Freshteh N Aghdam
(74) *Attorney, Agent, or Firm* — Meyertons, Hood, Kivlin, Kowert & Goetzel, P.C.

(57) ABSTRACT

A method and apparatus for adapting, in parallel, two operating parameters associated with an equalizer circuit is disclosed. A control circuit may be configured to initialize a first operating parameter to an initial value, and modify a second operating parameter based upon the initial value of the first parameter. In response to determining a peak amplitude of an output signal of the equalizer circuit is less than a threshold value, the control circuit may be further configured to select a new value for the first operating parameter and adapt, in response to the change in the first operating parameter, the second operating parameter based on a performance metric of the equalizer circuit.

20 Claims, 11 Drawing Sheets

JOINT ADAPTATION OF HIGH AND LOW FREQUENCY GAINS OF A LINEAR EQUALIZER

BACKGROUND

Technical Field

Embodiments described herein relate to high performance computing network systems, and more particularly, to serial data transfers.

Description of the Relevant Art

Computing systems typically include a number of interconnected integrated circuits. In some cases, the integrated circuits may communicate through parallel interfaces, which simultaneously communicate multiple bits of data. In other cases, the integrated circuits may employ a serial interface, which sequentially communicates one or more bits of data at a time. For both parallel and serial interfaces, communicated data may be differentially transmitted.

Parallel interfaces may utilize wide communication buses, i.e., buses that transport data words of 16 bits, 32 bits, 64 bits, or more in parallel. The physical implementation of such communication buses may consume significant area on an integrated circuit or system. Additionally, such buses may be susceptible to various parasitic effects. For example, inductive and/or capacitive coupling between individual wires of a bus may result in signal noise that may reduce a maximum frequency of transmission. Such parasitic effects may become more pronounced with increased operational frequencies and reduced geometric dimensions of the wide buses and associated interconnect. Moreover, impedance mismatch at the end of individual wires of a bus may result in reflection or ringing, further contributing to noise and increased propagation delays to the signals being transmitted.

To remediate problems associated with high-speed parallel data transmission, parallel data may be serialized at the transmission side before transmission, and then deserialized, on the receiver side, upon reception. A pair of Serializer and Deserializer (SERDES) circuits may be employed for this purpose.

SUMMARY OF THE EMBODIMENTS

Various embodiments of a data receiving system are disclosed. Broadly speaking, an apparatus and a method are contemplated, in which an equalizer circuit receive an input signal via a communication link, and amplify the input signal in a first frequency range and a second frequency range using a first operating parameter and a second operating parameter, respectively, to generate an output signal. A control circuit may initialize the first operating parameter to an initial value, and adapt the second operating parameter based on a performance metric of the equalizer circuit. The control circuit may further, in response to a determination that a peak amplitude of the output signal is less than a threshold value, set the first operating parameter to a first new value, otherwise, set the first operating parameter to a second new value. The control circuit may further adapt the second operating parameter based on the performance metric of the equalizer circuit in response to a change in the first operating parameter.

In one embodiment, the control circuit may halt further changes to the first operating parameter based upon a number of times a sign associated with the change in the first operating parameter has changed.

In another non-limiting embodiment, the control circuit may halt further changes to the first operating parameter based upon a value of a timer.

These and other embodiments will become apparent upon reference to the following description and accompanying drawings.

Figure 1:
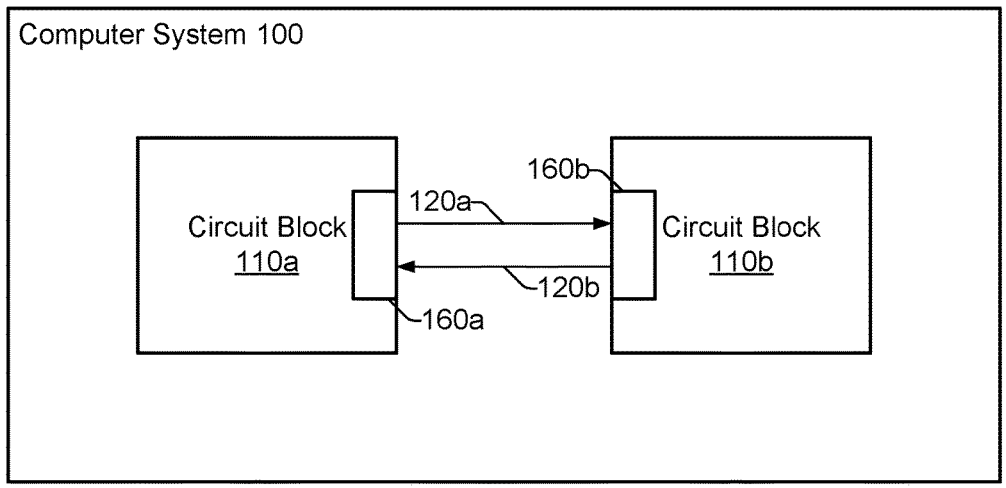
FIG. 1 is a generalized block diagram illustrating an embodiment of a computer system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

In some computing systems, data may be transmitted in a serial fashion from one circuit block to another circuit block. By employing serial data transfers, a computing system may reduce area and power consumption associated with wide parallel data transfer techniques. When employing serial data transfers, each circuit block may employ Serializer and Deserializer (SERDES) circuits, which may be configured to convert parallel data in a functional unit to serial data for transmission, and convert, received serial data back to parallel data, respectively. SERDES circuits may be used in various applications. For example, fiber optic communication systems, gigabit Ethernet systems, and cache coherence links in chip multi-threading (CMT) systems with multiple nodes may employ SERDES circuits.

Deserialization circuit include amplifier circuits configured to amplify a voltage level of the incoming serial data signal. The amplifier may have different gain levels for the DC component and the AC component of the incoming serial data signal. To compensate for losses in the transmission medium, the two gain components may be adapted or adjusted. The two gain parameters interact, so when one gain parameter is adjusted as part of the adaptation process, there may be an interaction with the other gain parameter. The embodiments illustrated in the drawings and described below may provide techniques for performing adaptation while accounting for the interactions between the two gain parameters.

Referring to FIG. 1, a generalized block diagram illustrating one embodiment of a computing system 100 is shown. Computing system 100 may include circuit block 110a coupled to circuit block 110b through serial communication channels 120a and 120b using interface units 160a and 160b. In various embodiments, a series of data symbols (or simply "symbols") may be transmitted via serial communication channels 120a and 120b. As used and described herein, a symbol is a single voltage level or a differentially encoded voltage level that corresponds to a particular logic value, such as, a logical-0, for example.

In various embodiments, either of circuit block 110a or circuit block 11b may include one or more processor cores. In some embodiments, the processor cores may implement any suitable instruction set architecture (ISA), such as, e.g., SPARC, PowerPC™, or x86 ISAs, or a combination thereof. Either of circuit blocks 110a-b may include one or more bus interfaces (not shown), which may allow circuit blocks 110a-b to communicate to other circuit blocks or functional units within computing system 100. It is noted that the arrangement of circuit blocks within computing system 100 depicted in FIG. 1 is merely an example. In other embodiments, other arrangements are possible.

Either of circuit blocks 110a or 110b may correspond to system memory within computing system 100. Alternatively, or additionally, circuit blocks 110a or 110b may also include a storage device such as, e.g., any suitable hard disk drive. Although a hard disk drive is used as an example, any storage medium may be contemplated, such as, e.g., solid-state drives, optical drives, or main memory, such as, dynamic or static RAMs, for example.

In some embodiments, serial communication channels 120a and 120b may include only differential data pairs with no dedicated clock signal, while, in other embodiments, a clock signal may be included with the data signals. Since circuit block 110a and circuit block 110b may not be physically located on a same circuit board, the two circuit blocks may not share a single clock source. In such cases, the transmitting block may encode a clock signal within the data stream.

Serial communication channels (also referred to herein as "links") 120a and 120b may conform to one or more high speed serial standards and include a copper wire or optical fiber cable with multiple conductive paths coupled between circuit blocks 110a and 110b. Serial communication channel 120a may be a unidirectional path from circuit block 110a to circuit block 110b and conversely serial communication channel 120b may be a unidirectional path from circuit block 110b to circuit block 110a. In other embodiments, other standards may be employed, and serial communication channels 120a and 120b may be bidirectional. In some embodiments, parallel data may be serialized prior to transmission across a respective channel/lane.

During operation, circuit block 110a may initiate a connection to circuit block 110b. To initiate a connection, a process referred to as channel training, or link training, may be utilized to configure interface units 160a and 160b for transmitting data via serial channels 120a-b. Circuit block 110a may send a stream of symbols to circuit block 110b via interface unit 160a. Interface unit 160b may sample the stream of symbols, using a reference voltage, until data timing requirements can be derived. Once timing requirements are derived, interface unit 160b may calculate one or more characteristics that will be sent to interface unit 160a to be used to adjust how interface unit 160a transmits data to interface unit 160b.

During link training, predetermined training data patterns may be sent from interface unit 160a to interface unit 160b. The training data patterns may be used to set operational parameters, such as, e.g., a data sampling point, based how the training data patterns are received by interface unit 160b. Moreover, as described below in more detail, a gain values for both low and high frequency components of the signals being transmitted via serial channels 120a-b may be adjusted and optimized during the link training operation.

It is noted the embodiment of FIG. 1 is merely an example. In other embodiments, different numbers of communication links and different configurations of communication links may be employed.

Figure 2:
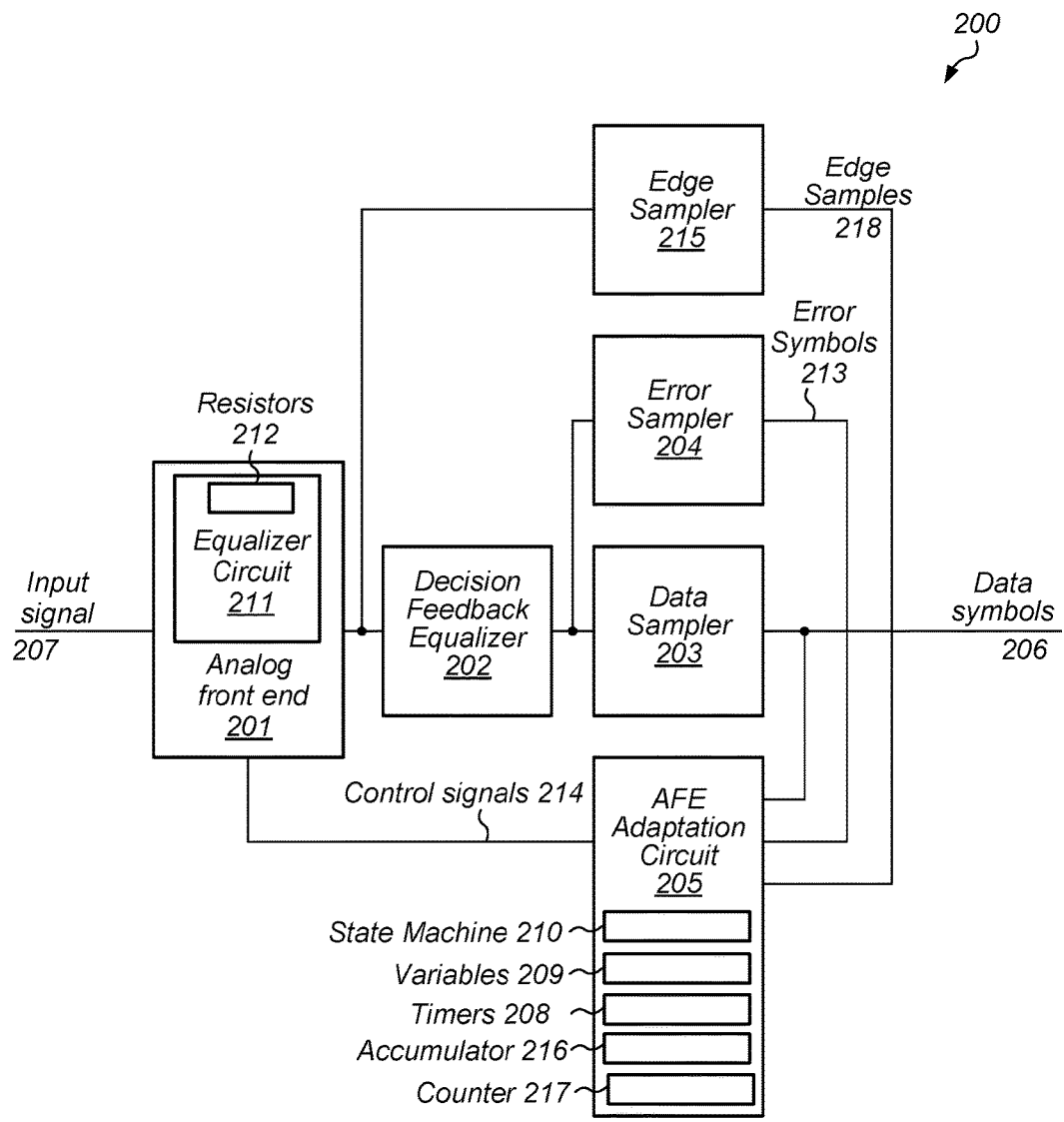
FIG. 2 illustrates a block diagram depicting an embodiment of a data receiver circuit.

Referring to FIG. 2, a block diagram of an embodiment of de-serialization circuit is illustrated. In various embodiments, data receiver circuit 200 may be included in interface unit 160b. In the illustrated embodiment, data receiver circuit 200 includes analog front-end (AFE) 201, decision feedback equalizer (DFE) 202, data sampler 203, error sampler 204, edge sampler 215, and AFE adaptation circuit 205.

AFE 201 may be configured to receive input signals 207. AFE 201 may, in various embodiments include equalizer circuit 211 and resistors 212. As used and described herein, an equalizer circuit is a circuit that amplifies an input signal with different gain levels for different frequency ranges of the input signal. For example, equalizer circuit 211 may have different gain levels for two different frequency ranges included in input signal 207. In some embodiments, the different gain levels may include a low frequency (LF) gain level for frequencies at or near a DC frequency level, and a high frequency (HF) gain level for frequencies greater than those included in the low frequency range. It is noted that although a single equalizer circuit is depicted in AFE 201 in the embodiment of FIG. 2, in other embodiments, any suitable number of equalizer circuits with different gain levels for different frequency ranges may be employed.

Resistors 212 may be included in a feedback path or input filter circuit for equalizer circuit 211. In various embodiments, the values of resistors 212 may be changed, based on one or more operating parameters, to adjust the low frequency gain level. In other embodiments, one or more capacitors (not shown) may be used to adjust the high frequency gain level for equalizer circuit 211. One or more switches (not shown) may be included to connect additional resistors into the aforementioned feedback paths or input filter circuit, or de-couple resistors from those circuits as part of the gain adjustment. As used and described herein, an operating parameter refers to a value that directly or indirectly affects the operation of a particular equalizer circuit.

The output of AFE 201 is coupled to DFE 202 and edge sampler 215. In various embodiments, DFE 202 may filter the output of AFE 201 prior to the generation of data symbols 206 by data sampler 203. In various embodiments, DFE 202 may include a finite impulse response (FIR) filter or any other suitable filter circuit.

As described below in more detail, edge sampler 215 may be configured to sample the output signal of equalizer circuit 211 at the crossing points of data eyes associated with the output signal. Edge sampler 215 may, in some embodiments, include a sample and hold circuit, or any other circuit suitable to sample a signal in response to a timing reference signal. In some embodiments, the timing reference signal used by edge sampler 215 may be a different frequency and/or phase than a timing reference signal used by data sampler 203.

Data sampler 203 may be configured to use the filtered signal generated by DFE 202 to generate data symbols 206, and error sampler 204 may be configured to generate error symbols 213 for use by AFE adaptation circuit 205. Data sampler 203 may include one or more analog to digital (ADC) circuits, or other suitable circuits, configured to determine logical values based upon the output of DFE 202. Error sampler 204 may also include one or more ADC circuit, and may employ different ADC threshold values or sample the output at different times to generate error symbols 213. Data sampler 203 may, during normal operation, send data symbols 206 to a circuit block included in computing system 100, such as, circuit block 110b, for example.

AFE adaptation circuit 205 may include state machine 210, variables 209, accumulator 216, and timers 208. As described below in more details, the aforementioned elements may be used to perform adaptation of the operating parameters that affect different gain settings for equalizer circuit 211. In various embodiments, AFE adaptation circuit 205 may optimize a second operating parameter for each value of first operating parameter. In some embodiments, the first operating parameter may affect a low frequency gain of equalizer circuit 211, and the second operating parameter may affect a high frequency gain of equalizer circuit 211. The frequency rangers corresponding to low and high frequencies may depend on characteristics of data receiver circuit 200, physical characteristics of a communication channel, such as, serial communication channels 120a and 120b as depicted in the embodiment of FIG. 1, and the like. By jointly, optimizing the operating parameters in parallel, AFE adaptation circuit 205 may account for interactions between changes in the two gain levels in AFE 201.

State machine 210 may include any suitable combination of sequential and combinatorial logic gates to transition between states and operating modes used as part of the adaptation process. Variables 209 may be any suitable combination of data bits stored in a register or other suitable storage circuit included in AFE adaptation circuit 205 or elsewhere in the computer system. Accumulator 216 may include one or more data storage circuits configured as a register or other suitable storage circuit. Timers 208 may also include any suitable combination of sequential and combinatorial logic gates configured to track a particular period of time. In some embodiments, the period of time may be programmable by software or user input.

It is noted that the embodiment illustrated in FIG. 2 is merely an example. In other embodiments, different configurations and combinations of circuit blocks are possible and contemplated.

When sampling an output of an equalizer circuit, such as, e.g., equalizer circuit 211, the threshold used by error sampler 204 may have different values relative to the output signal of the equalizer circuit. Different examples of the relative relationship between error sampler threshold and a peak amplitude of an output signal of an equalizer circuit are depicted in FIG. 3A-3D. As described below in more detail in regard to block 404 of the flow diagram illustrated in FIG. 4, positive peak amplitudes and negative peak amplitudes may be compared to the error sampler threshold.

Figure 3A:
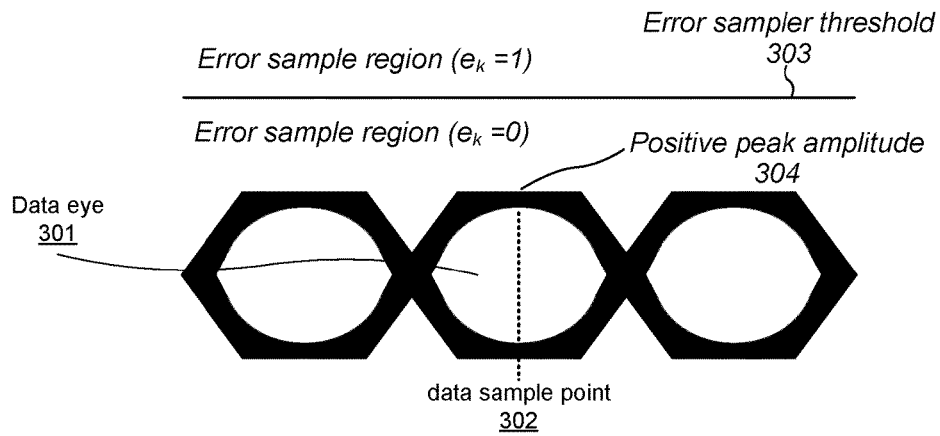
FIG. 3A is a representation of a timing diagram illustrating positive peak amplitude of an output signal of an equalizer circuit that is less than an error threshold.

In FIG. 3A, a situation where positive peak amplitude 303 of data eye 301 is less than error sampler threshold 303 is depicted. The comparison, which may correspond to block 404 of the flow diagram of FIG. 4, may be measured at data sample point 302. Since positive peak amplitude 303 is less than error sampler threshold 303, an error sample value of zero ($e_k=0$) will be assigned. Since the data sample value ($d_k$) is 1 for positive peak amplitude, the XOR of error sample and data sample is 1. In various embodiments, the gradient may be set to a value corresponding to the XOR of error sample and data sample (block 508 of the flow diagram of FIG. 5). In the situation depicted in FIG. 3A, the gradient is equal to 1. The gradient may be used in block 405 of the flow diagram of FIG. 4 to aid in a determination whether the equalizer circuit 211 is operating in a linear region. In various embodiments, the condition when equalizer circuit 211 is operating in a linear region is also referred to herein as the "peak amplitude is low."

Figure 3B:
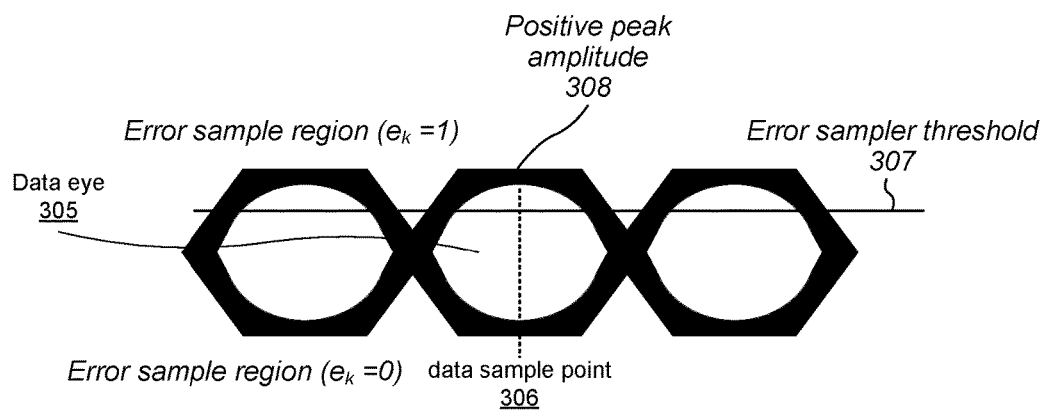
FIG. 3B is a representation of another timing diagram illustrating a positive peak amplitude of an output signal of an equalizer circuit that is greater than an error sampler threshold.

Turning to FIG. 3B, a situation where the positive peak amplitude of a data eye is greater than an error sampler threshold. In the present embodiment, positive peak amplitude 308 of data eye 305, sampled at data sample point 306, is greater than error sampler threshold 307. Since the value of positive peak amplitude 308 is greater than error sampler threshold 307, the error sample value will be assigned a value of one ($e_k=1$). Since the data sample value ($d_k$) is 1 for positive peak amplitude, the XOR of error sample and data sample is 0. The gradient may, in some embodiments, be equal to the XOR of error sample and data sample (block 508 of the flow diagram of FIG. 5). In the situation depicted in the diagram of FIG. 3B, the gradient is equal to 0. As described above, the gradient may be used in the determination of operating region of equalizer circuit 211.

Figure 3C:
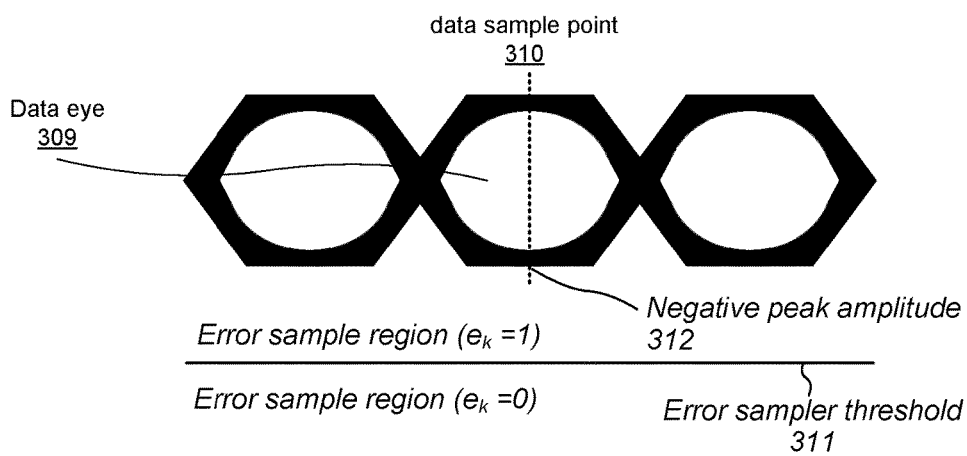
FIG. 3C is a representation of a different timing diagram illustrating a negative peak amplitude of an output signal of an equalizer circuit that is greater than an error sampler threshold.

In some cases, the negative peak amplitude of a data eye may also be used, either instead of the positive peak amplitude, or in addition to the positive peak amplitude, to determine the operating regime of an equalizer circuit. An example of the relationship between the negative peak amplitude of a data eye and the error sampler threshold is depicted in FIG. 3C. In the illustrated embodiment, negative peak amplitude 312 or data eye 309 is greater than error sampler threshold 311. Negative peak amplitude is sampled at data sample point 310. Since negative peak amplitude 312 is greater than error sampler threshold 311, the error sample value may be set to zero ($e_k=1$). Since the data sample value ($d_k$) is 0 for negative peak amplitude, the XOR of error sample and data sample is 1. In the present embodiment, the gradient is equal to the XOR of error sample and data sample (block 508 of the flow diagram of FIG. 5). In the situation depicted in the diagram of FIG. 3C. the gradient is equal to 1. As described above, the gradient may be used in the determination of operating region of equalizer circuit 211.

Figure 3D:
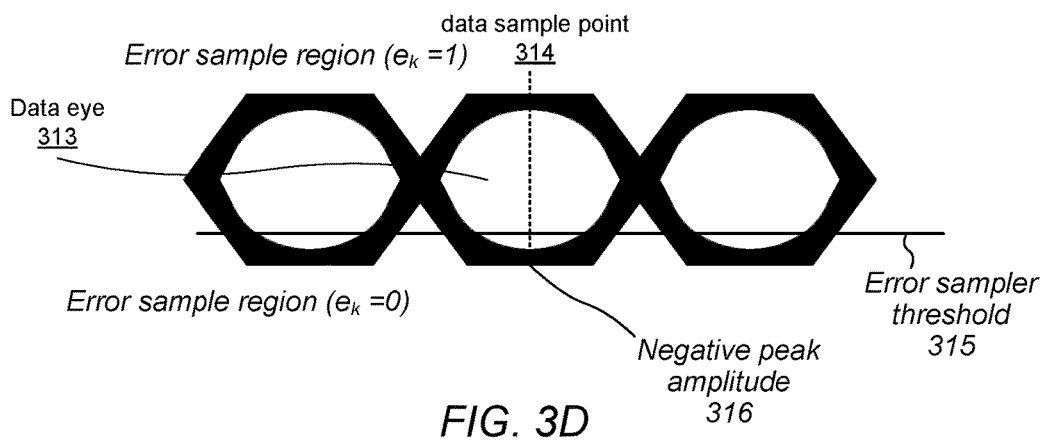
FIG. 3D is a representation of a particular timing diagram illustrating a negative peak amplitude of an equalizer circuit is less than an error sampler threshold.

Turning to FIG. 3D, a case where the negative peak amplitude of a data eye is less than the error sampler threshold. In the illustrated embodiment, negative peak amplitude 316 sampled from data 313 at data sample point 314 is less than error sampler threshold 315. Accordingly, the error sample value is set to ($e_k=0$). Since the data sample value ($d_k$) is 0 for negative peak amplitude, the XOR of error sample and data sample is 0. As described above, the gradient is equal to the XOR of error sample and data sample (block 508 of the flow diagram of FIG. 5), resulting in a case where the gradient is zero as depicted in the diagram of FIG. 3D. As described above, the gradient is used in determining the operating region of equalizer circuit.

It is noted FIG. 3A-3D is merely an example of the timing and shape of a data eye, and the relative relationships between positive and negative peak amplitudes of the data eye associated with an output of an equalizer circuit, and the level of the error sampler threshold. In various embodiments, data eyes may be observed in a variety of shapes and sizes based upon the characteristics of an individual communications link, as well as different characteristics of the equalizer circuit.

Figure 4:
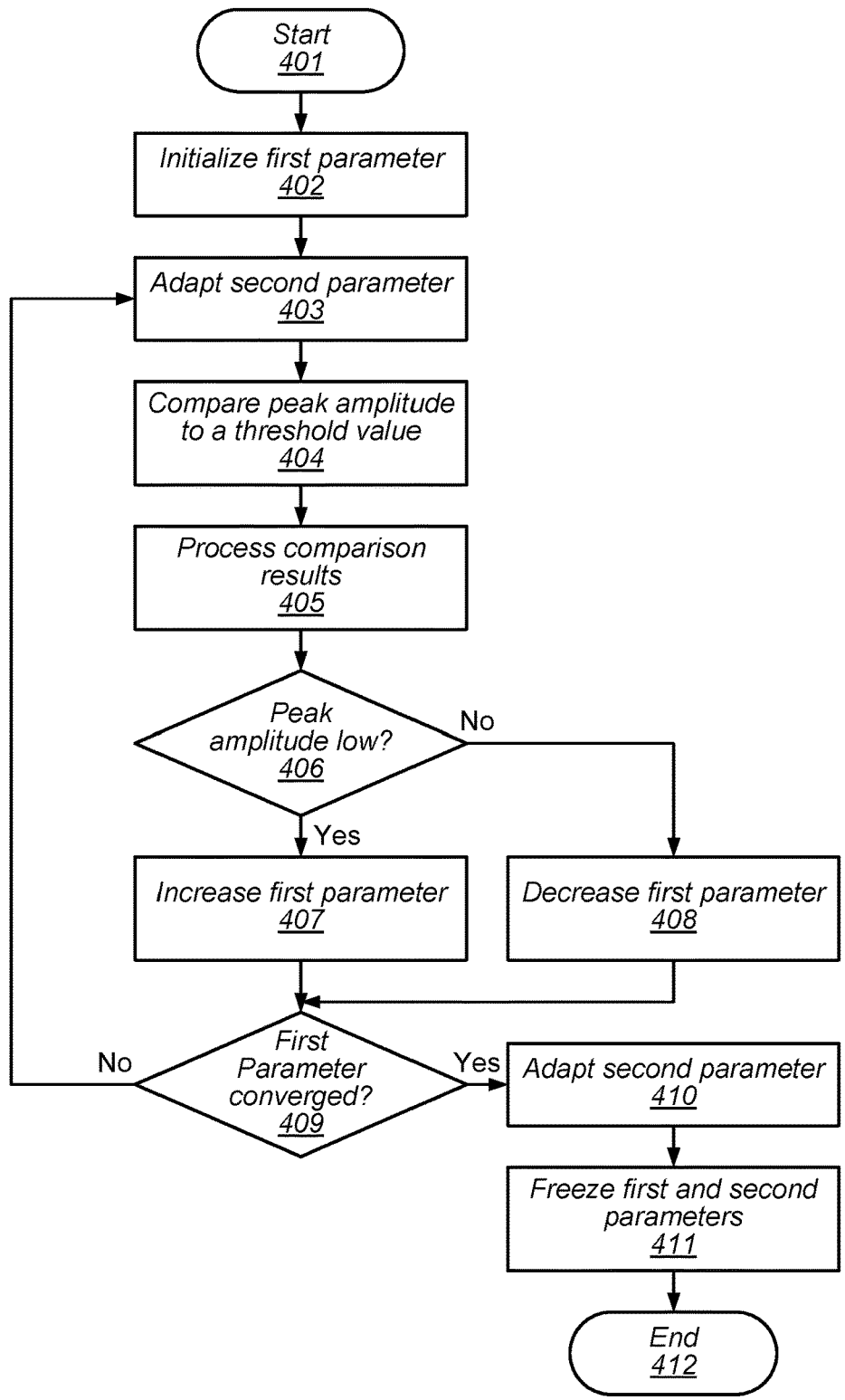
FIG. 4 illustrates a flow diagram depicting an embodiment of a method for adapting operating parameter values associated with an equalizer circuit.

Turning to FIG. 4, a flow diagram depicting an embodiment of a method for adapting the high and low frequency gain of an equalizer circuit is illustrated. Referring collectively to the embodiment of FIG. 2, and the flow diagram of FIG. 4, the method begins in block 401.

An initial value for the first operating parameter of equalizer circuit 211 may then be set (block 402). In various embodiments, the value of the first operating parameter may affect the low frequency gain of the equalizer circuit 211. For example, the first operating parameter may select a value of feedback resistance used in conjunction with equalizer circuit 211 to adjust the low frequency gain of equalizer 211.

Once an initial value for the first operating parameter has been set, a second operating parameter associated with equalizer circuit 211 may then be adapted (block 403). The second parameter may, in some embodiments, affect the high frequency gain of equalizer circuit 211 and may be adapted based on a performance metric of the equalizer circuit. As used and described herein a performance metric refers to a measurable characteristic associated with an equalizer circuit. For example, a performance metric may include eye margins, mean squared error of edge samples, and the like.

As used and described herein, adaption refers to a process by which a particular parameter is adjusted, in an iterative fashion, and based on other parameters to achieve a particular resultant value. As described below in more detail in regard to FIG. 6, the second operating parameter may be adjusted, in an iterative fashion, based on a gradient value of the output of equalizer circuit 211, until a timer has expired.

AFE adaptation circuit 205 may then determine a gradient value, which is indicative of the comparison result between the peak amplitude of an output of equalizer circuit 211 and a threshold value (block 404). The threshold value will be used as the error sampler threshold shown in FIG. 3A-3D, and may be determined based on characteristic of the data receiver circuit 200 and may, in some embodiments, be programmable during operation of data receiver circuit 200. AFE adaptation circuit 205 may then process results of the comparison (block 405). As described below in more detail regarding FIG. 5, AFE adaptation circuit 205 may determine whether the equalizer circuit 211 is operating in the linear region (or the peak amplitude is low) based on the processed result. It is noted that either a positive peak amplitude (as shown in FIG. 3A-3B) or a negative peak amplitude (see FIG. 3C-3D) of the output signal of equalizer circuit 211, or any suitable combination thereof, may be used to perform the comparison. The method then depends on the whether the peak amplitude is low or high (block 406).

If the peak amplitude is low, then the value of the first operating parameter may be increased (block 407). In some embodiments, the value of the first operating parameter may be increased by a predetermined value. Alternatively, the value of the first operating parameter may be increased by an amount that may be adjusted during operation of data receiver circuit 200.

Alternatively, the peak amplitude of the output signal of equalizer circuit 211 is high, then the value of the first operating parameter may be decreased (block 408). As above, the value of the first operating parameter may be adjusted by any suitable amount. Once the value of the first operating parameter has been either increased or decreased, the method may then depend on whether the value of the first operation parameter has converged (block 409).

The first operating parameter may be adjusted, in an iterative fashion, until a timer has expired or an amount, and direction, of change, of the first operating parameter, between one or more iterations indicates that the first operating parameter has satisfied a convergence criterion. If the value of the first operating parameter has not converged, then the method may continue from block 403 as described above. If, however, the value of the first operating parameter has converged, then the second operating parameter may be adapted (block 410). In various embodiments, the second operating parameter may be adapted using a process similar to that used in block 403.

Once the second operating parameter has converged, the values for the first and second operating parameters are frozen (block 411). Further changes to the first and second operating parameters may be stopped until a training session, or other suitable event, is detected by data receiver circuit 200. The method may then conclude in block 412.

It is noted that the embodiment of the method depicted in the flow diagram of FIG. 4 is merely an example. In other embodiments, different operations and different orders of operations may be employed.

As mentioned above, to adapt the operating parameters of an equalizer circuit, the peak amplitude of the output of the equalizer circuit may be determined. The method illustrated in the flow diagram of FIG. 5 may, in various embodiments, correspond to block 404 and 405 of the flow diagram of FIG. 4. Referring collectively to the embodiment of FIG. 2, and the flow diagram of FIG. 5, the method begins in block 501.

A particular of timers 208 may then be initialized (block 502). In various embodiments, the particular timer may be set to any suitable initial value. Once the particular time has been initialized, the timer may continue to track elapsed time. In some embodiments, the timer may count down from the initialized value, or may count up from zero until the initial value has been achieved, indicating the timer has expired. A value of accumulator 216 may then be set based on a value of the timer (block 503). Later, the value of accumulator 216 may be set to zero (block 504). The method may then depend on in the current error sample, $e_k$, is valid (block 506).

If the $e_k$ is not valid, then AFE adaptation circuit 205 sets a value of a gradient to zero (block 507). Alternatively, if $e_k$ is valid, then AFE adaptation circuit 205 performs an exclusive-OR (XOR) operation on $e_k$ and the current data word, $d_k$, and set the gradient to the result of the XOR operation (block 508).

Once the gradient value has be set, in either block 507 or 508, AFE adaptation circuit 205 add the value of the gradient to the value of the accumulator (block 509). In various embodiments, AFE adaptation circuit 205 may employ an adder, or other suitable circuit, to add the values of the gradient and the accumulator. The method then depends on results of a comparison of the accumulator value and the accumulator threshold set in block 503 (block 510).

If the accumulator value is greater than the accumulator threshold, then it is noted that the peak amplitude is not low (block 511). The determination of whether the peak amplitude of the output of equalizer circuit 211 may then be used in block 406 of the flow diagram depicted in FIG. 4 to determine a next operation to perform. In various embodiments, a value indicative of the peak amplitude state may be stored in particular one of variables 209. The method may then conclude in block 512.

Alternatively, if the accumulator value is less than or equal to the accumulator threshold, then the method may depend on the value of the particular timer (block 513). If the value of the timer indicates that the timer has not expired, then the method may continue from block 506 as described above.

Alternatively, if the value of the particular timer indicates that the particular timer has expired, then it is noted that the peak amplitude is low (block 514). In various embodiments, a value indicative of the peak amplitude state may be stored in a particular one of variables 209. The method may conclude in block 512.

Figure 5:
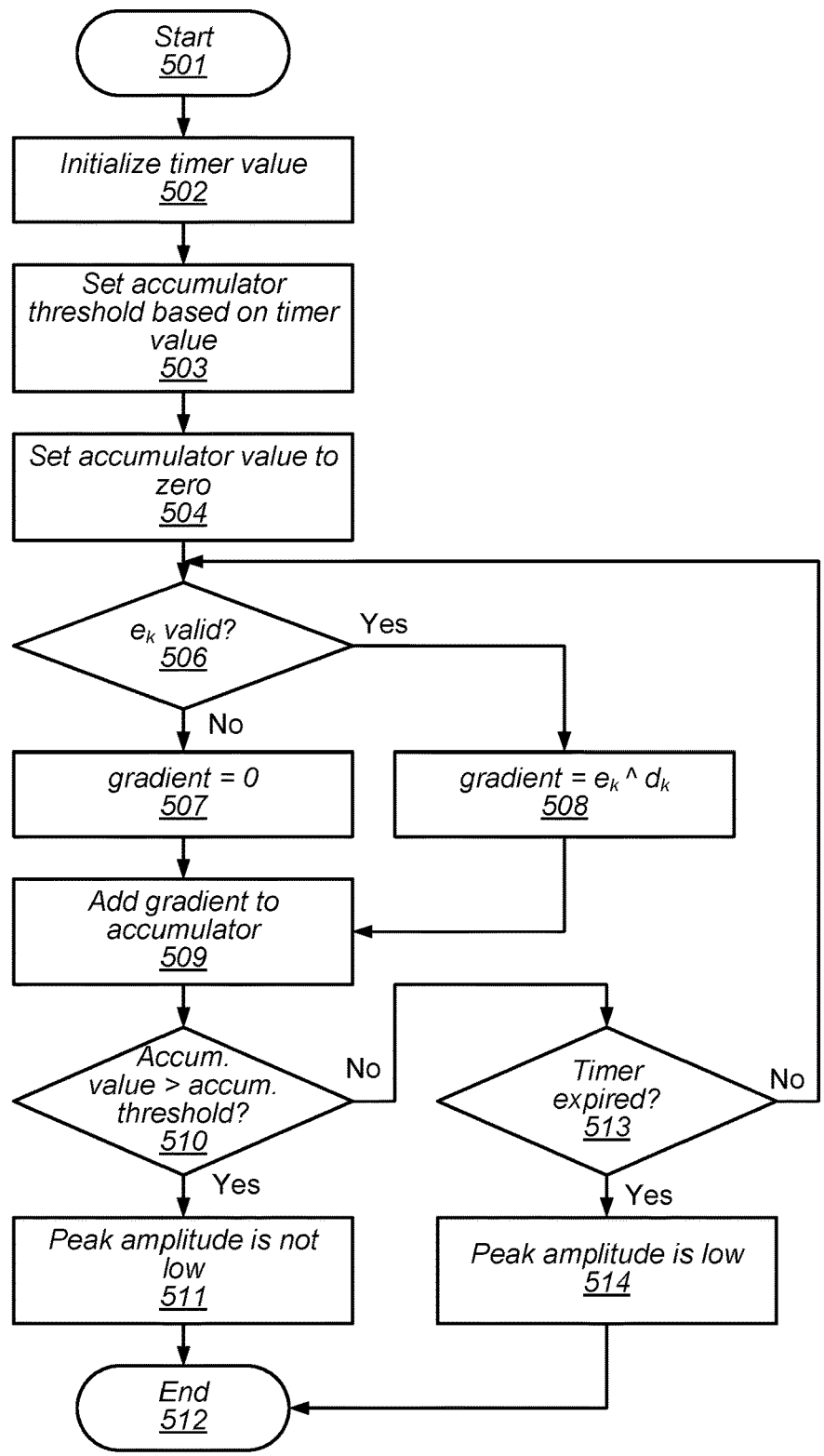
FIG. 5 illustrates a flow diagram depicting an embodiment of a method determining whether a peak value of an output of an equalizer circuit is still within a linear region of operation for the equalizer circuit.

It is noted that the embodiment of the method depicted in the flow diagram of FIG. 5 is merely an example. In other embodiments, different operations and different orders of operations may be employed.

As described above, once a particular value is selected for a first operating parameter of an equalizer circuit, then a second operating parameter associated with the equalizer circuit may be adapted according to one of various methods. An embodiment of a particular method for adapting the second operating parameter is depicted in the flow diagram of FIG. 6. Referring collectively to the embodiment in FIG. 2 and the flow diagram of FIG. 6, the method begins in block 601.

AFE adaptation circuit 205 may then select an initial value for the second operating parameter (block 602). AFE adaptation circuit may then initialize accumulator 216 by setting it to a particular value (block 603), as well as set a particular timer of timers 208 to track a particular period of time (block 604). The method may then depend on if the current edge sample is valid (block 605). If the current edge sample is not valid, then AFE adaptation circuit 205 may set a value of a gradient to zero (block 608). If, however, the current edge sample is valid, then the method may depend on if the current data sample includes a valid data pattern (block 606).

During a training operation, various data patterns may be employed. A data pattern may include a predetermined sequence of logic values. In some cases, the sequences of logic values may be determined to emphasize a particular characteristic of a serial communication link, such as, inter-symbol interference, for example.

If the current data sample, which includes a sequence of both data and edge samples, does not include a valid data pattern, then the gradient is again set to zero (block 608). As used and described herein a valid data pattern is a sequence on multiple consecutive samples of both data and edge values that match a predetermined pattern. In various embodiments, the predetermined pattern may be selected based on which pattern is best suited to minimizing mean squared errors of the edge samples. Alternatively, the AFE adaptation circuit 205 performs an XOR operation on the edge sample $x_k$ and the previous data sample, $d_{k-1}$, and sets the value of the gradient to the result of the XOR operation (block 607). Once the value of the gradient has been set, in either block 607 or 608, AFE adaptation circuit 205 adds the value of the gradient to the value of the accumulator (block 609). In various embodiments, AFE adaptation circuit 205 may employ an adder or any other suitable circuit to add the value of the gradient to that of the accumulator.

AFE adaptation circuit 205 may then set the value of the second operating parameter to a value indicative of the top N data bits of the accumulator (block 610). In various embodiments, N is a natural number that may be determined by characteristics of data receiver circuit 200, and may be adjusted during operation of data receiver circuit 200. The method may then depend on the state of the particular timer (block 611).

If the timer has expired, then the method may end in block 612. Alternatively, if the particular timer is still active, then the method may proceed from block 605 as described above (block 605).

Figure 6:
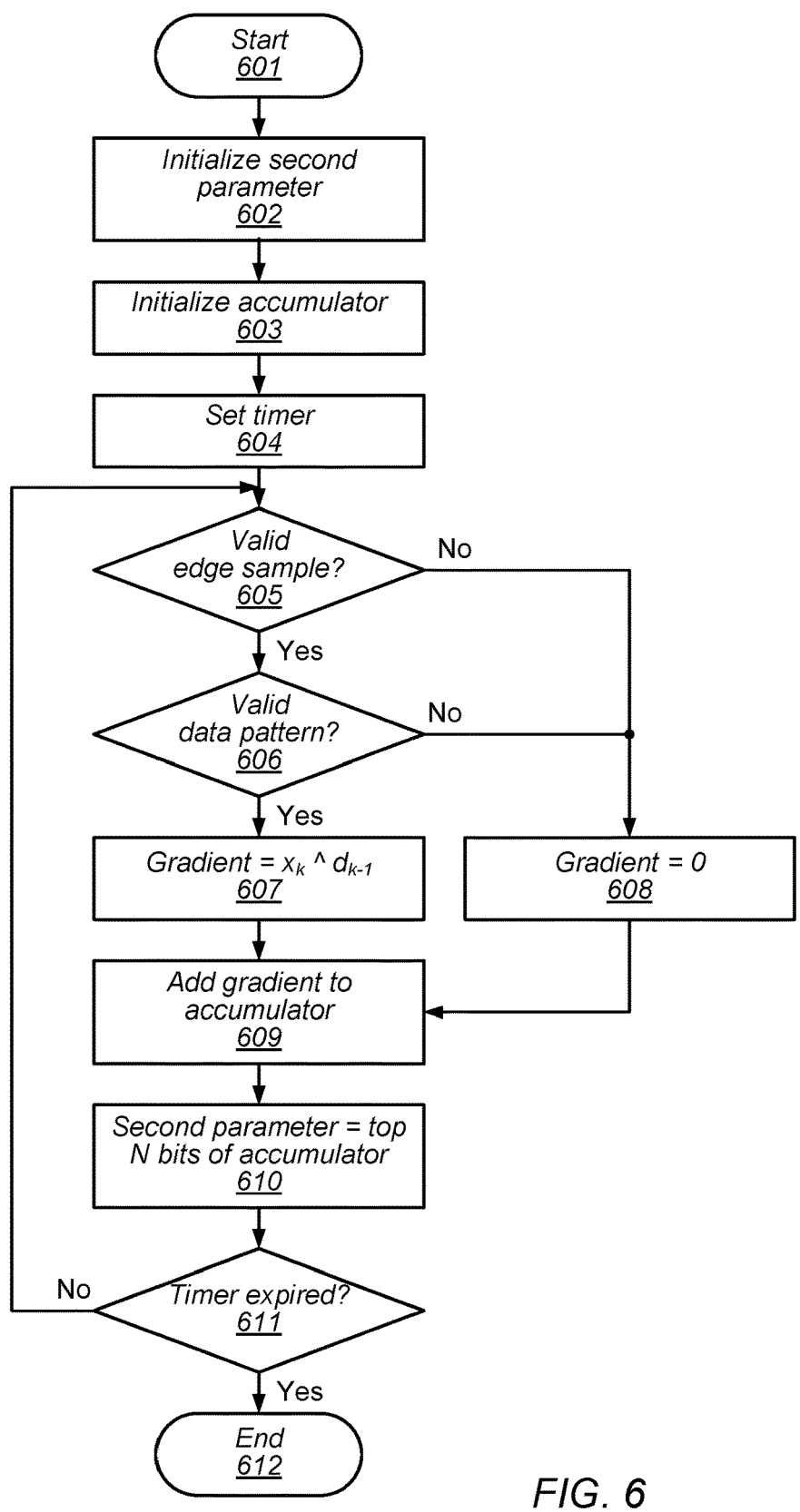
FIG. 6 illustrates a flow diagram depicting an embodiment of a method for adapting a second operating parameter associated with an equalizer circuit.

Although the operations of the embodiment illustrated in FIG. 6 are depicted as being performed in a serial fashion, in other embodiments, one or more of the operations may be performed in parallel.

When a change is made to the high frequency of an equalizer circuit, such as, e.g., equalizer circuit 211, noise may be introduced on the output of the equalizer circuit due to a change in high frequency gain of the equalizer circuit resulting from the parameter change. In various embodiments, it may be desirable to detect that data is valid on the output of the equalizer circuit before proceeding with additional measurements. An embodiment of a method for detecting a valid edge in the data is illustrated in the flow diagram of FIG. 7. Although the flow diagram illustrated in FIG. 7 depicts an infinite loop, in other embodiments, one or more break conditions may be used to terminate the loop.

Figure 7:
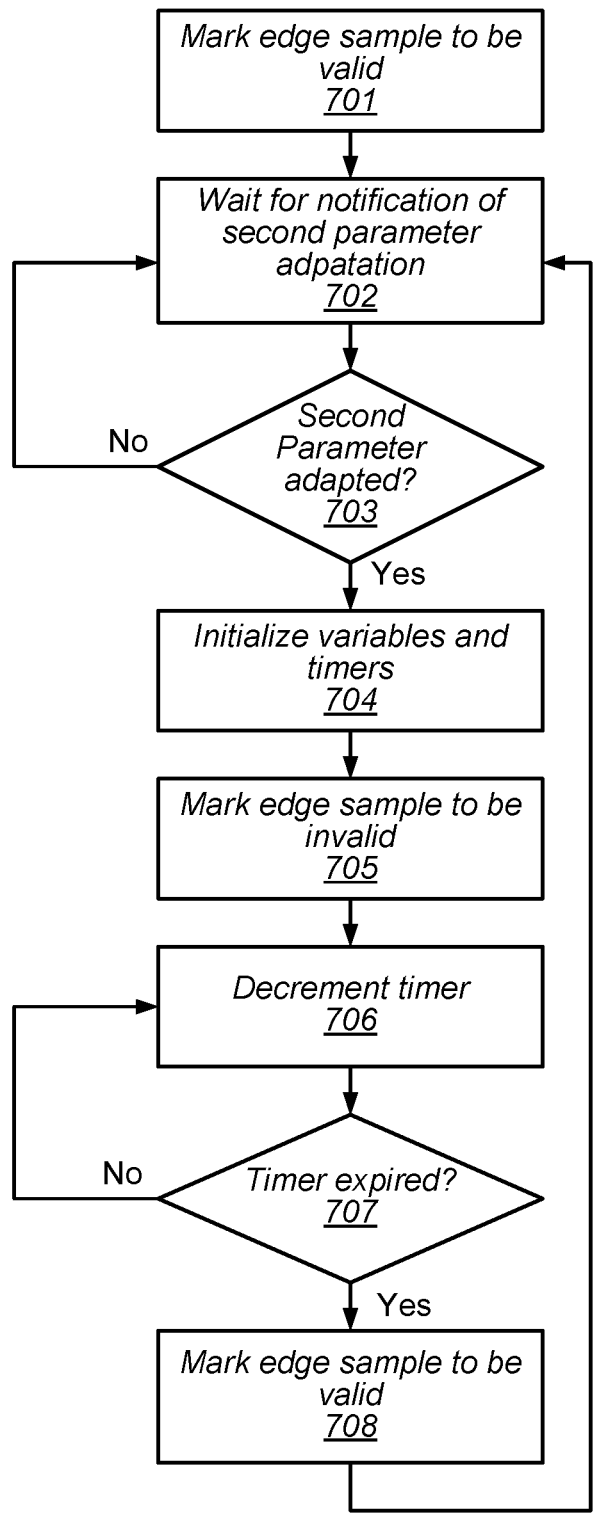
FIG. 7 illustrates a flow diagram depicting an embodiment of a method for detecting a valid edge in an output of an equalizer circuit.

The method depicted in the flow diagram of FIG. 7 may correspond to block 605 of the flow diagram of FIG. 6. Referring collectively to the embodiment of FIG. 2 and the flow diagram of FIG. 7, the method begins in block 701.

Edge sampler 215 may detect an edge in the output of equalizer circuit 211, and the edge may be initially assumed to be valid (block 701). Edge sampler 215 may then wait for notification the second operation parameter has been adapted (block 702). The method may then depend on whether the second operating parameter of equalizer circuit 211 has changed (block 703).

If the second operating parameter of equalizer circuit 211 has not been adapted, the method may proceed from block 702 as described above. Alternatively, if the second operating parameter of equalizer circuit 211 has been adapted, timers and variables used by edge sampler 215 may then be initialized (block 704). In various embodiments, the timers and variables may be set to any suitable initial values.

Once the timers and variables have been set, a state associated with the current edge may be set to indicate the edge is invalid (block 705). A timer may then be decremented (block 706). In various embodiments, edge sampler 215 may include one or more timer circuits, or edge sampler 215 may use timers 208 included in AFE adaptation circuit 205. The timer may be decremented using a shift register, adder circuit, or any other suitable logic circuit. The method then depends on the value of the timer (block 707).

If the value of the timer indicates that the timer has not yet expired, then the method may proceed from block 706 as described above. Alternatively, if the value of the timer indicates that the timer has expired, then the state variable associated with the current edge may be set to indicate that the edge is now valid (block 708). By delaying further operations after a change in the high frequency gain of equalizer circuit 211, incorrect symbol identification or other erroneous data may be avoided. The method may then continue in block 702 as described above.

It is noted that the method illustrated in the flow diagram of FIG. 7 is merely an example. In other embodiments, different operations and different orders of operations are possible and contemplated.

Figure 8A:
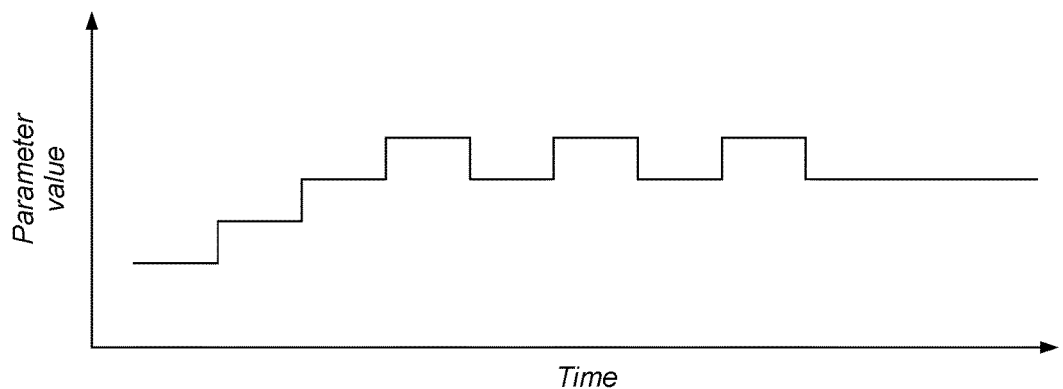
FIG. 8A depicts an example of convergence in an operating parameter of an equalizer circuit.
Figure 8B:
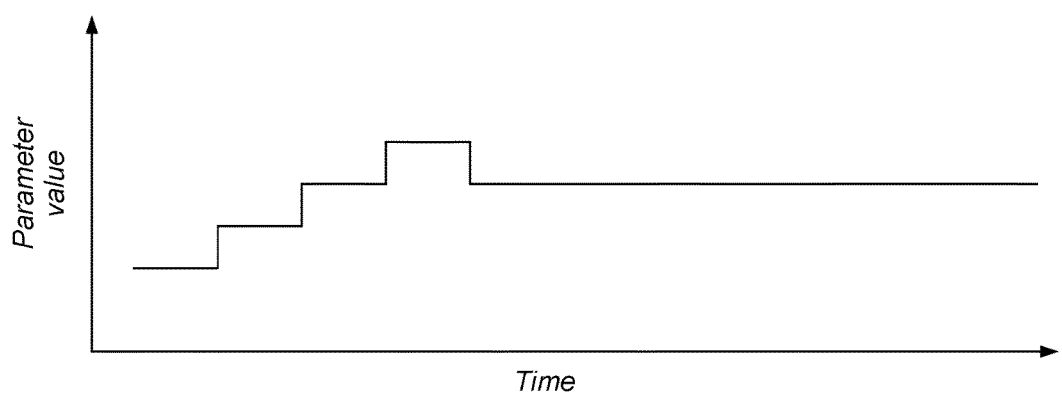
FIG. 8B depicts another example of convergence in an operating parameter of an equalizer circuit.
Figure 8C:
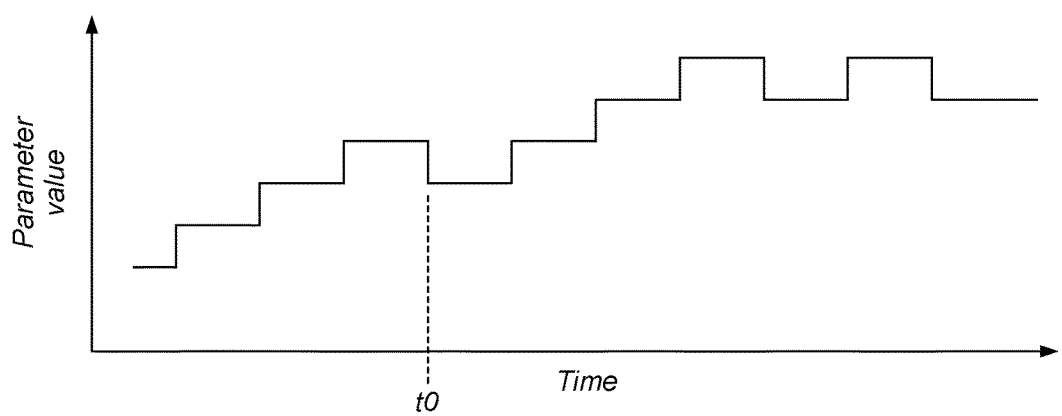
FIG. 8C depicts a particular example of convergence in an operating parameter of an equalizer circuit.

The first operating parameter associated with an equalizer circuit, such as, e.g., equalizer circuit 211 of FIG. 2, may change in various ways, as it is adapted. At some point, the changes in the value of the first operating parameter may satisfy at least one convergence criterion. The diagrams illustrated in FIG. 8A-8C, depict three different examples of how the value of parameter may converge, and the method described in the flow diagram of FIG. 9, may illustrate how to detect such different convergence criteria. In FIG. 8A, the parameter value increases for a period of time, at which point, the direction of the change in the parameter value oscillates between two values, increasing and decreasing in value. When the direction of the change in a parameter value oscillates in such a fashion for a particular number of updates of the value compared to a threshold value (as shown in block 908 of the flow diagram of FIG. 9), a particular convergence criterion is met, and the parameter value is noted as being converged, and further changes to the operating parameter are halted. In the present embodiments, the threshold is set to three, although it is noted that, in other embodiments, any suitable threshold value may be employed.

In FIG. 8B, another convergence criterion is illustrated. In the example illustrated in FIG. 8B, the threshold value has been set to one. The operating parameter value increases for a period of time. After that period of time, the parameter value starts to decrease. Since one direction change (from increase to decrease) of the operating parameter has been met (as in block 908), i.e., the threshold has been satisfied, the convergence criterion is met, and the parameter value is noted as being converged, and further changes to the operating parameter are halted.

In some cases, noise within a data receiving system may result in additional changes for an operating parameter before it converged. To reduce the impact of such noise, threshold values greater than one may be employed. In FIG. 8C, an example of the parameter value converging, when noise is present, is illustrated. As with the two previous cases, the parameter value increases for a period of time. At time t0, the parameter value decreases in value after a series of increases in value, and a first change in direction is noted. Since the threshold is set to three, in the present embodiment, the first direction change does not satisfy the convergence criterion. The next two changes to the value of the operating parameter do not involve a change in direction as described below in regard to block 906 of the flow diagram of FIG. 9, so they are not counted toward the convergence criterion. The next two changes after that, however, include direction changes, so the count value is incremented. When the threshold value of three is satisfied, the convergence criterion is met and further changes to the operating parameter are halted. It is noted that in this case, if a threshold value of one was used, the operating parameter would have been identified as being converged to an incorrect value. By employing a larger threshold value, the impact of noise, as described above, may be reduced.

It is noted that the examples of the a parameter value changing depicted in FIG. 8A-8C are merely examples. In other embodiments, the parameter value may change in any suitable way.

Figure 9:
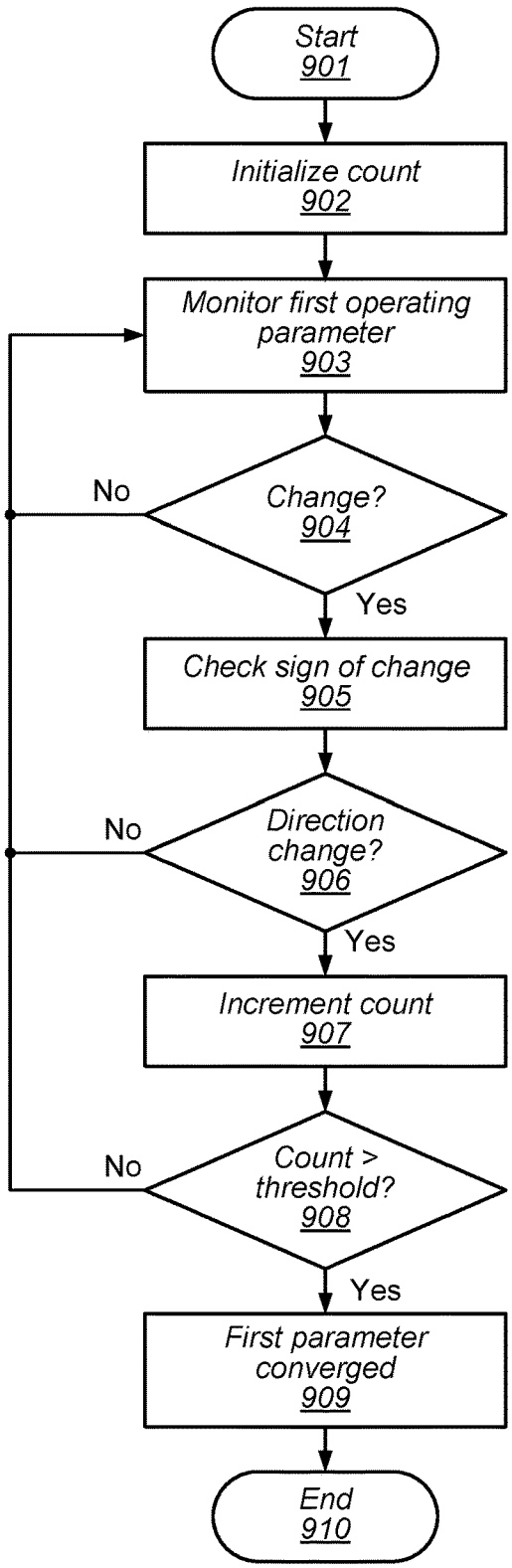
FIG. 9 illustrates a flow diagram depicting an embodiment of a method for determining convergence of an operating parameter of an equalizer circuit.

Turning to FIG. 9, a flow diagram depicting an embodiment of a method for determining convergence of an operating parameter is illustrated. In various embodiments, the method depicted in the flow diagram of FIG. 9 may correspond to block 409 of the flow diagram of FIG. 4. The method begins in block 901.

A count value may then be initialized (block 902). In various embodiments, the count value may be stored in a counter circuit, register file, or other suitable logic circuit. The count value may be set to zero, or any other suitable value.

A first operating parameter associated with an equalizer circuit may then be monitored (block 903). In various embodiments, a notification may be received that the first operating parameter has been adapted. In some cases, a comparator circuit, or other suitable circuit, may be employed to compare values of the first operating parameter taken at two difference times. Although the first operating parameter is described in the illustrated flow diagram, in other embodiments, a similar method may be applied to another operating parameter associated with the equalizer circuit. The method may then depend on if a change was detected (block 904).

If no change was detected, the method may continue from block 903 as described above. If, however, a change in the value of the first parameter was detected, then the sign of the change may be checked (block 905). As used and described herein, the sign of the change corresponds to whether the value of the first operating parameter increased or decreased. The method may then depend on the direction of the change (block 906).

If the sign of the change did not change, i.e., the sign of a previous change in value is the same as the sign of the current change in the first operating parameter value, then the method may proceed from block 903 as described above. If, however, the sign of the current change in the first operating parameter value is different from the sign of the previous change in value of the first operating parameter, then the count value is incremented (block 907). The count value may, in various embodiments, be incremented using a shift register, adder circuit, or any other suitable logic circuit. The method may then depend on the count value (block 908).

If the count value is less than or equal to a threshold value, then the method may proceed from block 903 as described above. It is noted that the threshold value may be determined based on performance characteristics of a data receiver circuit, such as, e.g., data receiver circuit 200, and may be programmable during operation of the data receiver system. Alternatively, if the count value is greater than the threshold value, then it is determined that the first operating parameter has converged (block 909). In various embodiments, a value in a register, or other suitable memory storage location, may be set to a value to indicate the first operating parameter has been converged.

It is noted that the embodiment of the method illustrated in the flow diagram of FIG. 9 is merely an example. In other embodiments, different operations and different orders of operations are possible and contemplated.

Figure 10:
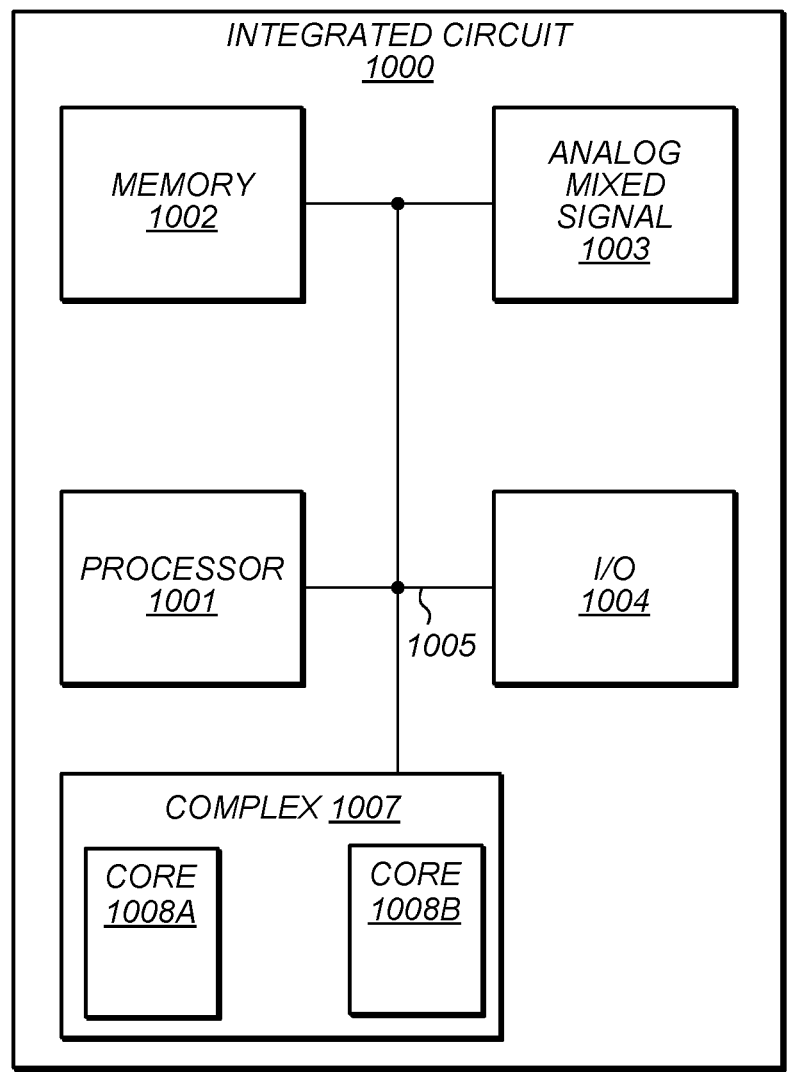
FIG. 10 depicts a block diagram of an embodiment of an integrated circuit.

A block diagram of an integrated circuit including multiple functional units is illustrated in FIG. 10. In the illustrated embodiment, the integrated circuit 1000 includes a processor 1001, and a processor complex (or simply a "complex") 1007 coupled to memory block 1002, and analog/mixed-signal block 1003, and I/O block 1004 through internal bus 1005. In various embodiments, integrated circuit 1000 may be configured for use in a desktop computer, server, or in a mobile computing application such as, e.g., a tablet or laptop computer.

Processor 1001 may, in various embodiments, be representative of a general-purpose processor that performs computational operations. For example, processor 1001 may be a central processing unit (CPU) such as a microprocessor, a microcontroller, an application-specific integrated circuit (ASIC), or a field-programmable gate array (FPGA).

Complex 1007 includes processor cores 1008A and 1008B. Each of processor cores 1008A and 1008B may be representative of a general-purpose processor configured to execute software instructions in order to perform one or more computational operations. Processor cores 1008A and 1008B may be designed in accordance with one of various design styles. For example, processor cores 1008A and 1008B may be implemented as an ASIC, FPGA, or any other suitable processor design.

Memory block 1002 may include any suitable type of memory such as a Dynamic Random Access Memory (DRAM), a Static Random Access Memory (SRAM), a Read-only Memory (ROM), Electrically Erasable Programmable Read-only Memory (EEPROM), or a non-volatile memory, for example. It is noted that in the embodiment of an integrated circuit illustrated in FIG. 10, a single memory block is depicted. In other embodiments, any suitable number of memory blocks may be employed.

Analog/mixed-signal block 1003 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal block 1003 may be configured to perform power management tasks with the inclusion of on-chip power supplies and voltage regulators.

I/O block 1004 may be configured to coordinate data transfer between integrated circuit 1000 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O block 1004 may be configured to implement a version of Universal Serial Bus (USB) protocol or IEEE 1394 (Firewire®) protocol.

I/O block 1004 may also be configured to coordinate data transfer between integrated circuit 1000 and one or more devices (e.g., other computing systems or integrated circuits) coupled to integrated circuit 1000 via a network. In one embodiment, I/O block 1004 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 1004 may be configured to implement multiple discrete network interface ports.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
an equalizer circuit configured to:
receive an input signal received via a communication link; and
amplify the input signal in a first frequency range and a second frequency range using a first operating parameter and a second operating parameter, respectively, to generate an output signal; and
a control circuit configured to:
initialize the first operating parameter to an initial value;
adapt the second operating parameter based upon a performance metric of the equalizer circuit;
in response to a determination that a peak amplitude of the output signal is less than a first threshold value, set the first operating parameter to a first new value, otherwise set the first operating parameter to a second new value; and
adapt the second operating parameter based on the performance metric of the equalizer circuit in response to a change in the first operating parameter.

2. The apparatus of claim 1, wherein the control circuit is further configured to halt further changes to the first operating parameter based upon a number of times a sign associated with the change in the first operating parameter has changed.

3. The apparatus of claim 1, wherein the control circuit is further configured to halt further changes to the first operating parameter based upon a value of a timer.

4. The apparatus of claim 1, wherein the control circuit is further configured to:
perform a comparison of the peak amplitude of the output signal to the first threshold value;
process a result of the comparison to generate a processed result; and
determine an adjustment to the first operating parameter using the processed result.

5. The apparatus of claim 4, wherein to process the result of the comparison, the control circuit is further configured to perform a comparison between a second threshold value and a number of times the peak amplitude is greater than the first threshold value.

6. The apparatus of claim 1, further comprising a sampling circuit configured to:
generate a plurality of data symbols using the output signal; and
generate a plurality of error symbols using the output signal; and
wherein the control circuit is further configured to determine a gradient using the plurality of data symbols and the plurality of error symbols, wherein the gradient is indicative of whether the peak amplitude of the output signal is above the first threshold value.

7. A method, comprising:
initializing a first operating parameter to an initial value associated with an equalizer circuit coupled to a communication link;
adapting a second operating parameter based upon a performance metric of the equalizer circuit;
in response to determining that a peak amplitude of an output signal of the equalizer circuit is less than a first threshold value, setting the first operating parameter to a first new value, otherwise, setting the first operating parameter to a second new value; and
adapting the second operating parameter based on the performance metric of the equalizer circuit in response to a change in the first operating parameter.

8. The method of claim 7, further comprising, halting further changes to the first operating parameter based upon a number of times a sign associated with the change in the first operating parameter has changed.

9. The method of claim 7, further comprising, halting further changes to the first operating parameter based upon a value of a timer.

10. The method of claim 7, further comprising:
performing a comparison of the peak amplitude of the output signal to the first threshold value;
processing a result of the comparison to generate a processed result; and
determining an adjustment to the first operating parameter using the processed result.

11. The method of claim 10, wherein processing the result of the comparison include performing a low pass filter operation using the result of the comparison.

12. The method of claim 7, wherein a value of the first operating parameter includes first information indicative of a direct current (DC) gain value, and the second operating parameter includes second information indicative of an alternating current (AC) gain value.

13. The method of claim 7, wherein a value of the first operating parameter includes first information indicative of an AC gain value, and the second operating parameter includes second information indicative of a DC gain value.

14. A system, comprising:
a circuit block; and
a de-serialization circuit coupled to a communication link and the circuit block, wherein the de-serialization circuit include an equalizer circuit, and wherein the de-serialization circuit is configured to:
receive an input signal received via a communication link; and
amplify the input signal in a first frequency range and a second frequency range using a first operating parameter and a second operating parameter, respectively, to generate an output signal; and
initialize the first operating parameter to an initial value;
adapt the second operating parameter based upon a performance metric of the equalizer circuit;
in response to a determination that a peak amplitude of the output signal is less than a first threshold value, set the first operating parameter to a first new value, otherwise set the first operating parameter to a second new value; and
adapt the second operating parameter based on the performance metric of the equalizer circuit in response to a change in the first operating parameter.

15. The system of claim 14, wherein the de-serialization circuit is further configured to halt further changes to the first operating parameter based upon a number of times a sign associated with the change in the first operating parameter has changed.

16. The system of claim 15, wherein the de-serialization circuit is further configured to halt further changes to the first operating parameter based upon a value of a timer.

17. The system of claim 16, wherein the de-serialization circuit is further configured to:
perform a comparison of the peak amplitude of the output signal to the first threshold value;
process a result of the comparison to generate a processed result; and
determine an adjustment to the first operating parameter using the processed result.

18. The system of claim 17, wherein to process the result of the comparison, the de-serialization circuit is further configured to perform a comparison between a second threshold value and a number of times the peak amplitude is greater than the first threshold value.

19. The system of claim 18, wherein the de-serialization circuit is further configured to:
generate a plurality of data symbols using the output signal; and
generate a plurality of error symbols using the output signal; and
wherein the control circuit is further configured to determine a gradient using the plurality of data symbols and the plurality of error symbols, wherein the gradient is indicative of whether the peak amplitude of the output signal is above the first threshold value.

20. The system of claim 14, wherein the equalizer circuit includes a continuous time linear equalizer circuit.

* * * * *